US 7,716,270 B2

(12) United States Patent
Hatsch et al.

(10) Patent No.: US 7,716,270 B2
(45) Date of Patent: May 11, 2010

(54) CARRY-RIPPLE ADDER

(75) Inventors: Joel Hatsch, Unterhaching (DE); Winfried Kamp, Munich (DE)

(73) Assignee: Infineon Technologies AG, Munich (DE)

( * ) Notice: Subject to any disclaimer, the term of this patent is extended or adjusted under 35 U.S.C. 154(b) by 1094 days.

(21) Appl. No.: 11/374,396

(22) Filed: Mar. 13, 2006

(65) Prior Publication Data

US 2006/0235923 A1  Oct. 19, 2006

(30) Foreign Application Priority Data

Mar. 14, 2005  (DE) ................ 10 2005 011 666

(51) Int. Cl.
  *G06F 7/50* (2006.01)
(52) U.S. Cl. ............... 708/707; 708/700; 708/706
(58) Field of Classification Search ............. 708/700, 708/706–714
  See application file for complete search history.

(56) References Cited

U.S. PATENT DOCUMENTS

| 3,636,334 | A | * | 1/1972 | Svoboda | 708/709 |
| 3,906,211 | A | * | 9/1975 | Glaser | 708/709 |
| 5,805,491 | A | * | 9/1998 | Bechade | 708/708 |
| 5,995,029 | A | * | 11/1999 | Ryu | 341/101 |
| 6,978,290 | B2 | * | 12/2005 | Hatsch et al. | 708/709 |
| 7,111,033 | B2 | * | 9/2006 | Ferroussat | 708/629 |
| 7,447,726 | B2 | * | 11/2008 | Kershaw et al. | 708/625 |
| 7,487,198 | B2 | * | 2/2009 | Hatsch et al. | 708/708 |
| 2003/0033343 | A1 | * | 2/2003 | Hatsch et al. | 708/700 |
| 2006/0294178 | A1 | * | 12/2006 | Bernhardt et al. | 708/707 |

FOREIGN PATENT DOCUMENTS

| DE | 10117041 | 7/2002 |
| DE | 10139099 | 2/2003 |
| DE | 10305849 | 7/2004 |

OTHER PUBLICATIONS

Drerup, B.C.; Swartzlander, E.E., Jr., "Fast multiplier bit-product matrix reduction using bit-ordering and parity generaton," 1992 Conference Record of The Twenty-Sixth Asilomar Conference on Signals, Systems and Computers, pp. 356-360 vol. 1, Oct. 26-28, 1992.*
German Office Action dated Dec. 13, 2005.

* cited by examiner

*Primary Examiner*—Chat C Do
*Assistant Examiner*—Matthew Sandifer
(74) *Attorney, Agent, or Firm*—Jenkins, Wilson, Taylor & Hunt, P.A.

(57) ABSTRACT

A carry-ripple adder has four summing inputs for receiving four input bits having the significance w that are to be summed, three carry inputs for receiving three input carry bits having the significance w, a summation output for outputting an output summation bit having the significance w, and three carry outputs for outputting three output carry bits having the significance 2w.

19 Claims, 16 Drawing Sheets

FIG 4

| Z | Y | X | C | B | A |
|---|---|---|---|---|---|
| 0 | 0 | 0 | 0 | 0 | 0 |
| 0 | 0 | 1 | 0 | 0 | 1 |
| 0 | 1 | 0 | 0 | 0 | 1 |
| 0 | 1 | 1 | 0 | 1 | 1 |
| 1 | 0 | 0 | 0 | 0 | 1 |
| 1 | 0 | 1 | 0 | 1 | 1 |
| 1 | 1 | 0 | 0 | 1 | 1 |
| 1 | 1 | 1 | 1 | 1 | 1 |

FIG 8

| B3 | B2 | B1 | B0 | N4 | N3 | N2 | N1 | N0 |
|----|----|----|----|----|----|----|----|----|
| 0 | 0 | 0 | 0 | 0 | 0 | 0 | 0 | 1 |
| 0 | 0 | 0 | 1 | 0 | 0 | 0 | 1 | 0 |
| 0 | 0 | 1 | 1 | 0 | 0 | 1 | 0 | 0 |
| 0 | 1 | 1 | 1 | 0 | 1 | 0 | 0 | 0 |
| 1 | 1 | 1 | 1 | 1 | 0 | 0 | 0 | 0 |

FIG 10

| N4 | N3 | N2 | N1 | N0 | C2IN | C1IN | C0IN | C2OUT | C1OUT | C0OUT |
|---|---|---|---|---|---|---|---|---|---|---|
| 0 | 0 | 0 | 0 | 1 | 0 | 0 | 0 | 0 | 0 | 0 |
| 0 | 0 | 0 | 0 | 1 | 0 | 0 | 1 | 0 | 0 | 0 |
| 0 | 0 | 0 | 0 | 1 | 0 | 1 | 1 | 0 | 0 | 1 |
| 0 | 0 | 0 | 1 | 1 | 1 | 0 | 0 | 0 | 0 | 1 |
| 0 | 0 | 0 | 1 | 0 | 0 | 0 | 1 | 0 | 0 | 0 |
| 0 | 0 | 0 | 1 | 0 | 0 | 1 | 1 | 0 | 0 | 1 |
| 0 | 0 | 0 | 1 | 0 | 1 | 0 | 1 | 0 | 0 | 1 |
| 0 | 0 | 1 | 0 | 0 | 0 | 1 | 0 | 0 | 1 | 1 |
| 0 | 0 | 1 | 0 | 0 | 0 | 0 | 1 | 0 | 0 | 1 |
| 0 | 0 | 1 | 0 | 0 | 1 | 1 | 1 | 0 | 1 | 1 |
| 0 | 1 | 0 | 0 | 0 | 0 | 0 | 0 | 0 | 0 | 1 |
| 0 | 1 | 0 | 0 | 0 | 1 | 1 | 1 | 0 | 1 | 1 |
| 0 | 1 | 0 | 0 | 0 | 0 | 1 | 1 | 1 | 1 | 1 |
| 1 | 0 | 0 | 0 | 0 | 0 | 0 | 0 | 0 | 0 | 1 |
| 1 | 0 | 0 | 0 | 0 | 0 | 1 | 1 | 0 | 1 | 1 |
| 1 | 0 | 0 | 0 | 0 | 1 | 1 | 1 | 1 | 1 | 1 |

FIG 15

| N4 | N3 | N2 | N1 | N0 | C2IN | C1IN | C0IN | S |
|----|----|----|----|----|------|------|------|---|
| 0 | 0 | 0 | 0 | 1 | 0 | 0 | 0 | 0 |
| 0 | 0 | 0 | 0 | 1 | 0 | 0 | 1 | 1 |
| 0 | 0 | 0 | 0 | 1 | 0 | 1 | 1 | 0 |
| 0 | 0 | 0 | 0 | 1 | 1 | 1 | 1 | 1 |
| 0 | 0 | 0 | 1 | 0 | 0 | 0 | 0 | 1 |
| 0 | 0 | 0 | 1 | 0 | 0 | 0 | 1 | 0 |
| 0 | 0 | 0 | 1 | 0 | 0 | 1 | 1 | 1 |
| 0 | 0 | 0 | 1 | 0 | 1 | 1 | 1 | 0 |
| 0 | 0 | 1 | 0 | 0 | 0 | 0 | 0 | 0 |
| 0 | 0 | 1 | 0 | 0 | 0 | 0 | 1 | 1 |
| 0 | 0 | 1 | 0 | 0 | 0 | 1 | 1 | 0 |
| 0 | 0 | 1 | 0 | 0 | 1 | 1 | 1 | 1 |
| 0 | 1 | 0 | 0 | 0 | 0 | 0 | 0 | 1 |
| 0 | 1 | 0 | 0 | 0 | 0 | 0 | 1 | 0 |
| 0 | 1 | 0 | 0 | 0 | 0 | 1 | 1 | 1 |
| 0 | 1 | 0 | 0 | 0 | 1 | 1 | 1 | 0 |
| 1 | 0 | 0 | 0 | 0 | 0 | 0 | 0 | 0 |
| 1 | 0 | 0 | 0 | 0 | 0 | 0 | 1 | 1 |
| 1 | 0 | 0 | 0 | 0 | 0 | 1 | 1 | 0 |
| 1 | 0 | 0 | 0 | 0 | 1 | 1 | 1 | 1 |

CARRY-RIPPLE ADDER

BACKGROUND OF THE INVENTION

1. Field of the Invention

The present invention relates to a carry-ripple adder and to an adding apparatus for the summation of a plurality of binary coded numbers.

2. Description of the Prior Art

Adders are known in the art and generally serve for adding equivalent bits, the corresponding summation value being output as a summation or parity bit and further necessary carry bits being generated. Carry-save (CS) adders have, for example, a number of inputs having equal entitlement for receiving the number of equivalent bits to be summed and, during operation, sum the bits present at the inputs with equal entitlement. That is to say that generally the same number of controllable paths of transistors lies between a carry or summation output of a CS adder and an internal supply voltage terminal.

In carry-ripple (CR) adders, the inputs do not have equal entitlement, but rather are organized into summing inputs and carry inputs. In this case, the bits present at the summing inputs are summed taking account of the carry bits present at the carry inputs and a corresponding summation bit is output. In this case, the carry bits present at the carry inputs are obtained during the summation of equivalent bits having a lower significance. Furthermore, a carry-ripple adder supplies at carry outputs carry bits having a higher significance than the bits present at the summing and carry inputs.

In this case, the critical path between a carry input and a carry output of a CR adder is intended to be embodied with maximum speed optimization, that is to say to have the fewest possible logic gates. Consequently, CR adders are suitable for use as output stages of adding devices for adding binary coded numbers since the calculation operation, preceding from a least significant digit of the summation result, for determining the summation bit having the next higher significance, provides particularly rapidly the carry bits required for the calculation thereof.

German patent 101 17 041 C1 describes a carry-ripple adder having five inputs for bits having an identical significance w that are to be summed and two inputs for receiving carry bits having the same significance w. A summation bit having the significance w can be tapped off at an output and two carry bits having different significances 2w and 2w can be tapped off at two carry outputs.

German patent 103 05 849 B3 likewise describes a carry-ripple adder having three summing inputs for input bits having an identical significance w that are to be summed and two carry inputs for carry bits having the same significance w. A summation bit having the significance w can be tapped off at an output and carry bits having the significance 2w can be tapped off at two carry outputs.

The carry-ripper adder according to published German patent application 101 39 099 A1 provides three or four inputs for input bits having the identical significance w that are to be summed and two inputs for receiving carry bits having the same significance w. A summation bit can be tapped off at an output and two outputs are provided for two carry bits having the significances 2w and 4w.

SUMMARY OF THE INVENTION

It is an object of the present invention to provide a carry-ripple adder, in particular for rapidly adding four equivalent bits, which has a smallest possible number of logic gates in a carry path between carry inputs and carry outputs.

The object is achieved in accordance with the invention by means of a carry-ripple adder, comprising:

a) four summing inputs for receiving four input bits having the significance w that are to be summed;

b) three carry inputs for receiving three input carry bits having the significance w;

c) a summation output for outputting an output summation bit having the significance w; and having d) three carry outputs for outputting three output carry bits having the significance 2w.

The carry-ripple adder according to the invention performs the summation of four equivalent bits having the significance w taking account of three input carry bits having the significance w. In this case, three output carry bits having the higher significance 2w are likewise generated. Carry bits are usually represented by the fewest possible bits, so that only a small number of carry outputs are required. An outputting in the form of two carry bits respectively having the significance 2w and 4w would usually be appropriate here. According to the invention, however, all the input carry bits are provided with the same significance as the input bits to be summed. The output carry bits, moreover, likewise have the same significance 2w in each case.

Preferably, the input bits to be summed may be present in presorted fashion at the summing inputs in each case in such a way that different logic levels are present at at most two adjacent summing inputs. To put it clearly, this means that set or non-set bits are always present contiguously at adjacent summing inputs. The 16 possible combinations of the logic levels present at the summing inputs are thereby reduced to just five. These five combinations correspond to the respective possible summation values of the four input bits.

It is furthermore preferred for the input carry bits to be present in presorted fashion at the carry inputs in such a way that the same logic levels may be present at at least two adjacent carry inputs. This presorting of the input carry bits according to the invention likewise permits, since the input carry bits have the same significance, the possible combinations of logic levels at the carry inputs to be reduced from eight to only four.

In a particularly preferred embodiment, the output carry bits are sorted at the carry outputs in such a way that the same logic levels are present at at least two adjacent carry outputs. By virtue of the fact that the same sorting as is present at the carry inputs, for example, is also present at the carry outputs, a circuit of a plurality of CR adders according to the invention for example as output stages of adding apparatuses for adding a plurality of binary numbers is particularly simple. The correspondingly sorted output carry bits are then used as input carry bits of a CR adder for calculating sums of input bits having a next higher significance.

In an alternative embodiment of the inventive carry-ripple adder, the respective input bits to be summed are present in presorted fashion at three first summing inputs in such a way that the same logic levels are present at at least two adjacent inputs from among the first summing inputs, and a further input bit to be summed being present at a further summing input.

A sorting device may be provided for receiving the bits to be summed which are present at the summing inputs and for outputting said bits in sorted fashion at sorter outputs in such a way that different logic levels are present at at most two adjacent summing inputs. Such a sorting device then only has to prefix or attach the further input bit to be summed, in a manner dependent on its logic level, to the first input bits present in presorted fashion.

In a further restricted version of the inventive carry-ripple adder, a carry sorting device is provided for receiving the input carry bits present at the carry inputs and for outputting said bits in sorted fashion at carry sorter outputs in such a way that the same logic levels are present at at least two adjacent carry sorter outputs.

If the corresponding input bits to be summed or input carry bits are not already present with the particularly favourable sorting, the carry sorting device or the sorting device will perform the corresponding sorting, which is favourable for fast operation of the carry-ripple adder according to the invention.

In a restricted version of the inventive carry-ripple adder, a coding device is provided having coder inputs for receiving the input bits to be added and having five coder outputs, a state indication bit in each case being present at the coder outputs. The coding device accordingly performs a mapping of the possible combinations of logic states of the input bits to be added onto five state indication bits at the corresponding coder outputs.

The coding device and the sorting device may be embodied as an integrated sorting-coding apparatus.

In each case only one of the state indication bits may be set and each state indication bit may be assigned to a summation result of the four input bits to be summed. Consequently, each state indication bit indicates one of the possible summation values between decimal zero and four.

The inventive carry-ripple adder may have a carry device for receiving the input carry bits and for outputting the output carry bits, which carry device supplies the output carry bits in a manner dependent on the state indication bits and the input carry bits. The carry device according to the invention can supply the corresponding three output carry bits particularly rapidly through the processing of the in each case only one set state indication bit and the three input carry bits. In this case, the state indication bits in each case control a controllable switch having a control terminal and a controllable path of the carry device.

In another restricted version of the inventive carry-ripple adder, at most two controllable paths of controllable switches are arranged between a respective carry output and a supply voltage terminal. Through the control of the controllable paths by means of the state indication bits, it is possible to create a particularly speed-optimized carry path between a carry input and a carry output of the CR adder. The corresponding critical path thus has a particularly small number of logic gates or only a few speed-reducing controllable paths are arranged between a respective carry output and an internal supply voltage terminal.

The object is also achieved in accordance with the invention by means of an adding apparatus for summing a plurality of bit sets each having bits having the same significance w, bits of different bit sets having a different significance, and a) each bit set being assigned a carry-save adder for summing the bits of a respective bit set and for outputting an intermediate summation bit having the significance w of the respective bit set and at least two intermediate carry bits having the respective next higher significance 2w;

b) at least one bit set being assigned a carry-ripple adder for summing the respective intermediate summation bit having the significance w and at least two intermediate carry bits having the significance w of a respective e bit set having the next lower significance w/2 taking account of at least two carry bits having the significance w, which were obtained during the summation of bit sets having a lower significance, as input carry bits and for outputting a bit set summation bit having the significance w of the respective bit set and at least two carry bits having the respective next higher significance 2w as output carry bits.

One essential idea of the inventive adding apparatus consists firstly in the summation of the bits of the respective bit set or of the bits having an identical significance of digits of a plurality of binary coded numbers to be added, and outputting in the form of an intermediate summation bit and the equivalent intermediate carry bits. Carry-optimized carry-ripple adders are then provided in the output stage of the adding apparatus according to the invention, which adders particularly rapidly supplies the respective output carry bits to the respective carry-ripple adder having the next higher significance.

At least one carry-save adder may be designed as a 7-bit adder and outputs the respective intermediate summation bit having the significance w and three intermediate carry bits having the significance 2w.

At least one of the carry-ripple adders may be designed as an inventive carry-ripple adder. In this advantageous combination of carry-save and carry-ripple adders in the adder apparatus according to the invention, a carry-ripple adder in each case supplies a summation of the intermediate summation bit and the three intermediate carry bits which are obtained from the summation by the carry-save adder of the bits of the bit set having the respective next lower significance, the respective CR adder supplying in speed-optimized fashion corresponding output carry bits as input carry bits to a CR adder having the next higher significance. By virtue of the use of the carry-ripple adders according to the invention, the entire carry path between the carry outputs of the corresponding carry-ripple adder having the highest significance and the carry inputs of the carry-ripple adder having the second lowest significance is particularly fast.

In a restricted version of the inventive adder apparatus, the carry-ripple adder assigned to the bit set having the second lowest significance is fed the intermediate carry bits of the carry-save adder assigned to the lowest significance as input carry bits.

In a further restricted version of the inventive adder, in a signal path between a carry input of the carry-ripple adder assigned to the bit set having the lowest significance and a carry output of the carry-ripple adder assigned to the bit set having the highest significance, the number of logic gates is at most double the number of different significances.

DESCRIPTION OF THE DRAWINGS

FIG. 4 is a table of the preferred presorting of bits to be added.

FIG. 8 is a truth table of the coding device.

FIG. 10 is a truth table of the carry device.

FIG. 15 is a truth table of the summing device.

DESCRIPTION OF THE PREFERRED EMBODIMENTS

In the figures, identical or functionally identical elements have been provided in each case with identical reference symbols.

Figure 1:
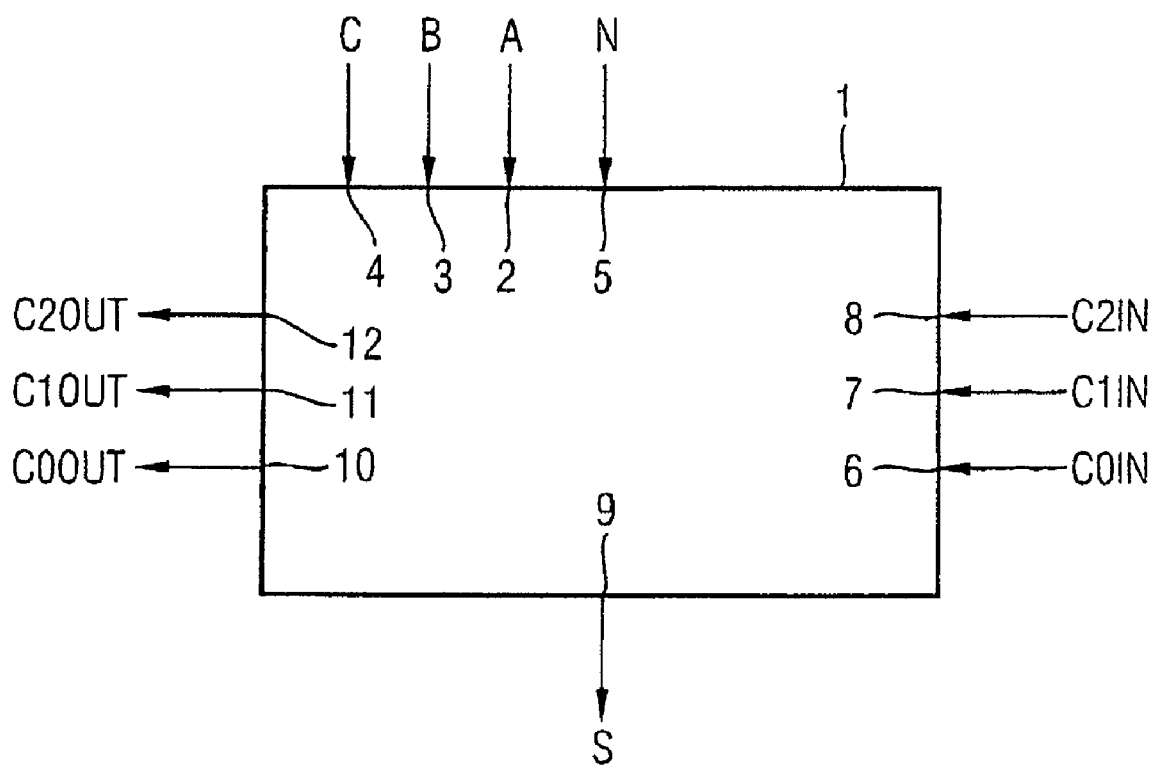
FIG. 1 is an exemplary embodiment of an inventive carry-ripple adder.

FIG. 1 shows a carry-ripple adder 1 according to the invention. The CR adder has four summing inputs 2, 3, 4, 5 for receiving four input bits A, B, C, N to be summed. Furthermore, the CR adder 1 has three carry inputs 6, 7, 8 for receiving three input carry bits C0IN, C1IN, C2IN. A summation output 9 for outputting an output summation bit S and three carry outputs 10, 11, 12 for outputting three output carry bits C0OUT, C1OUT, C2OUT are provided.

In this case, the input bits A, B, C, N and the input carry bits C0IN, C1IN, C2IN have the same significance w. The output summation bit S corresponds to the sum or parity of the summation of the input bits A, B, C, N that is determined taking account of the input carry bits C0IN, C1IN, C2IN, and likewise has the significance w. The three output carry bits C0OUT, C1OUT, C2OUT have the same significance 2w in each case.

The CR adder 1 according to the invention is particularly suitable for use in an adder apparatus because the calculation of the output carry bits C0OUT, C1OUT, C2OUT is effected particularly rapidly, that is to say that the carry path between the carry inputs 6, 7, 8 and carry outputs 10, 11, 12 is designed in optimized fashion in such a way that only few logic gates are traversed. This results inter alia from the choice of the significance of the carry bits C0IN, C1IN, C2IN, C0OUT, C1OUT, C2OUT and the sorting thereof as are present at the carry inputs 6, 7, 8 and carry outputs 10, 11, 12, respectively.

Figure 2:
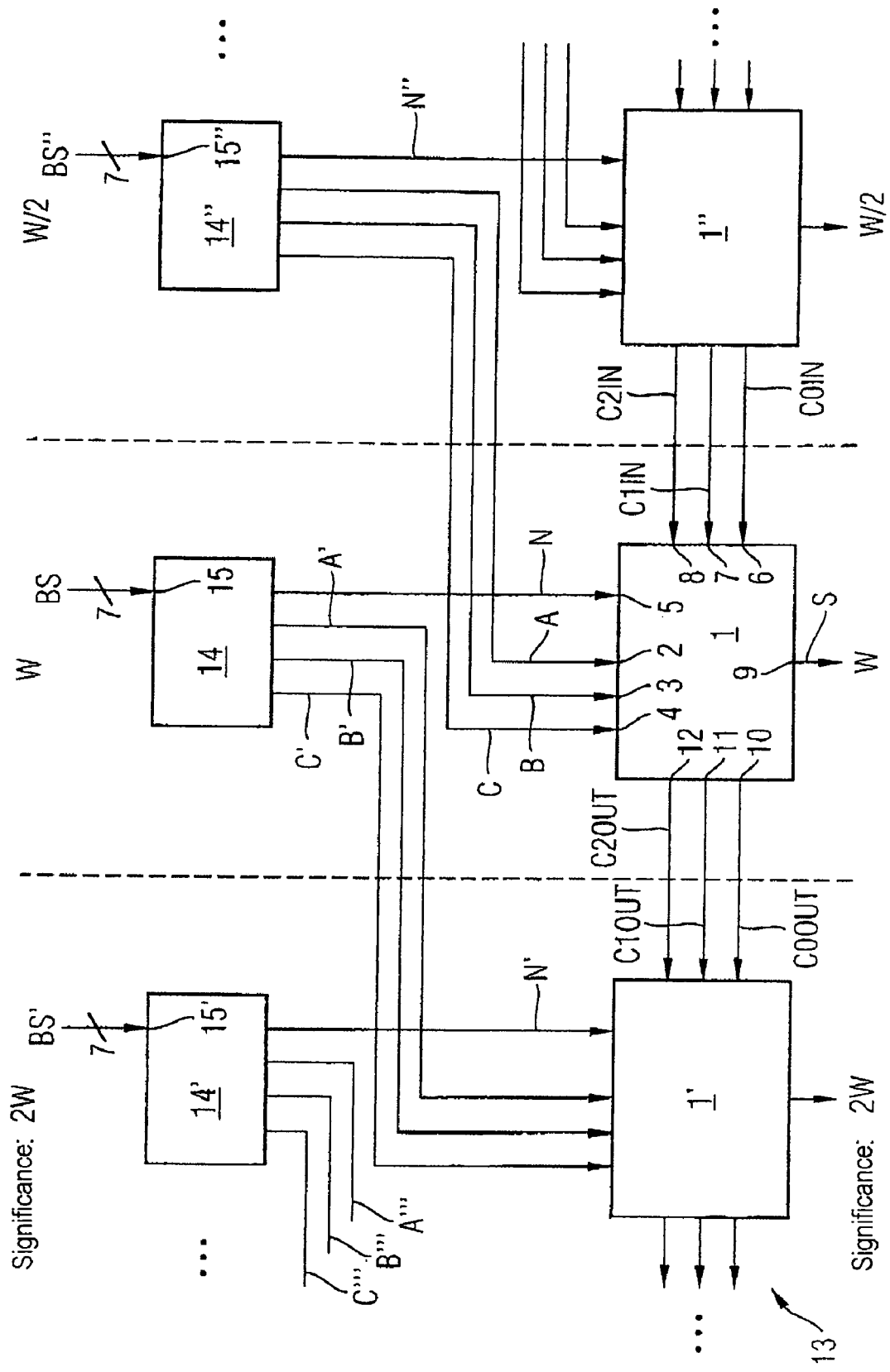
FIG. 2 is a detail of an exemplary embodiment of an inventive adder apparatus.

FIG. 2 illustrates a detail from an adder apparatus 13 according to the invention. The adder apparatus 13 serves for adding a plurality of binary coded numbers. In the embodiment illustrated here, three 7-bit carry-save adders 14, 14', 14" are provided, which each have seven inputs 15, 15', 15" for receiving seven bits having the same significance. The adding apparatus 13 illustrated here is thus designed for summing seven binary coded numbers with one another.

In this case, the respective equivalent bits or binary digits of the binary coded numbers to be added are combined into bit sets. A bit set thus has seven equivalent bits. Bits from different bit sets have different significances. A bit set BS having 7 bits having the significance w is fed to a first CS adder 14 and the 7 bits of a second bit set BS" having the next lower significance w/2 are in each case fed to a second CS adder 14", and the 7 bits of a bit set BS' of a bit set having the next higher significance 2w are fed to a third 7-bit CS adder 14'.

The first CS adder 14 supplies an intermediate summation bit N from the summation of the 7 bits of the bit set BS having the significance w. Said intermediate summation bit N likewise has the significance w. Furthermore, the first CS adder supplies three carry bits A', B', C' having the significance 2w. In addition to the parity or the intermediate summation bit N, the representation of the possible eight summation values from the summation of 7 bits requires a number of carry bits having a higher significance. According to the invention, three equivalent intermediate carry bits A', B', C' having the significance 2w are generated for this purpose during the summation of bits having the significance w. The CS adders 14', 14" having the respective next lower and next higher significance w/2, 2 w analogously supply intermediate summation bits N', N" and intermediate carry bits A, B, C, A''', B''', C'''. The second CS adder 14" generates for example an intermediate summation bit N" having the significance w/2 and three intermediate carry bits A, B, C having the significance w.

Therefore, four bits having the same significance are present in each case after the summation by the CS adders 14, 14', 14". The result of the summation of the seven binary coded numbers is intended likewise to be output in the form of a binary coded number. This means that the corresponding summation bit has to be generated for each binary digit. However, proceeding from the lowest significance here that is to say the lowest digit of the binary result number, it is necessary to take account of a respective carry for the determination of the next higher summation bit.

The determination of the respective summation bit S or of the binary digit of the binary coded result number will now be explained using the example of the significance w. According to the invention, a 4-bit CR adder 1 is used such as is shown in FIG. 1, and the intermediate summation bit N and the intermediate carry bits A, B, C of the CS adder having the next lower significance are in each case fed to it as input bits at its summing inputs 2, 3, 4, 5. From a corresponding summation of the bits of the bit set BS" having the next lower significance (here w/2), however, it is also necessary to take account of carriers in the form of three carry bits C0IN, C1IN, C2IN. Proceeding from the least significant digit of the binary result number or the bit set having the least significant bits, the carries are generated in a carry path by all the CR adders kept available. According to the invention, this is done particularly rapidly by the use of the CR adders according to the invention.

The CR adder 1 assigned to the bit set having the significance w thus supplies at its summation output 9 a respective bit set summation bit S and at three carry outputs 10, 11, 12 three output carry bits C0OUT, C1OUT, C2OUT, which have a next higher significance (here 2 w). The corresponding carry bits C0OUT, C1OUT, C2OUT are fed to the respective CR adder 1' having the next higher significance as input carry bit.

Figure 3:
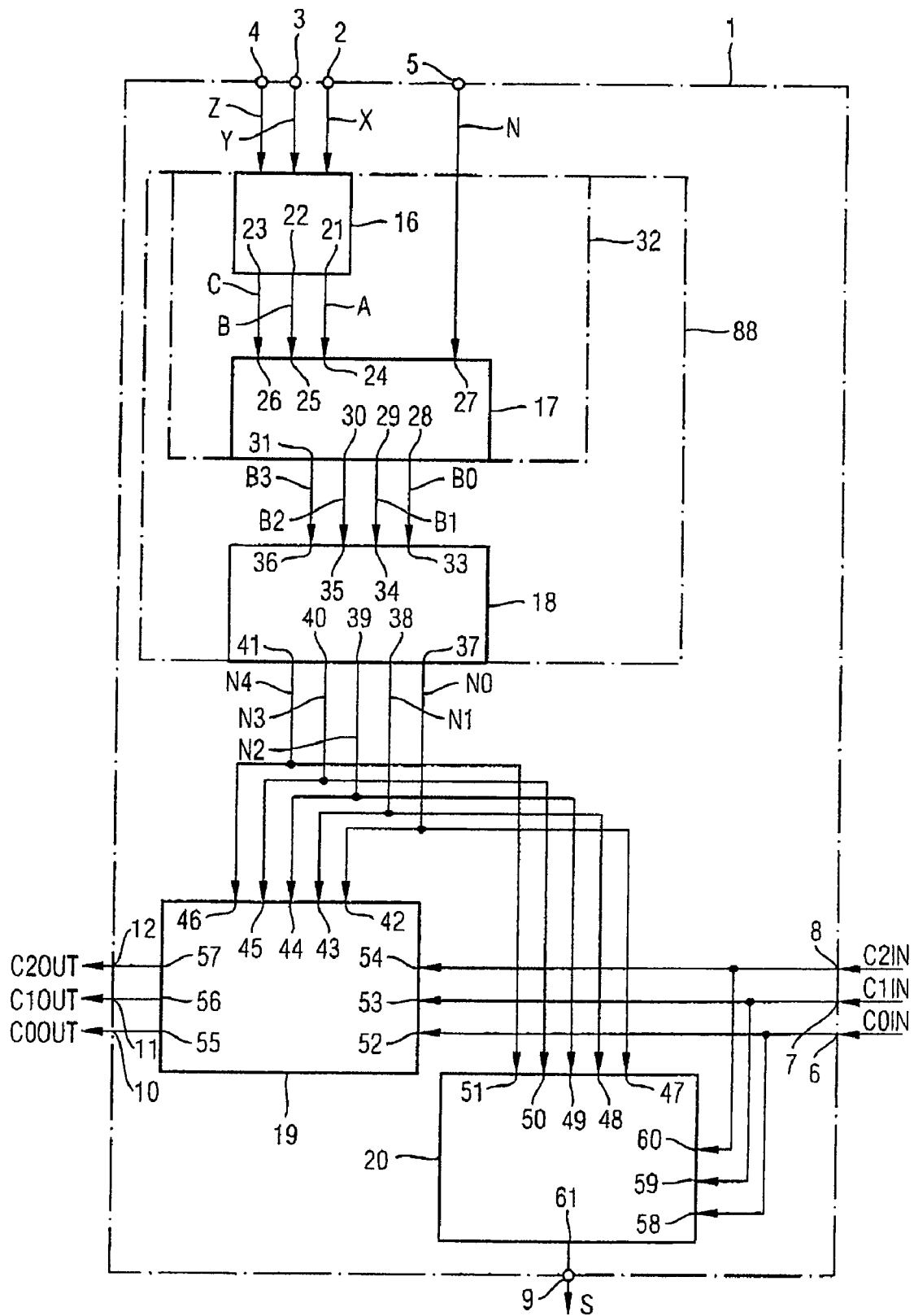
FIG. 3 is a block diagram of the inventive carry-ripple adder.

FIG. 3 shows a block diagram of a carry-ripple adder 1 according to the invention. The CR adder 1 already has, as illustrated in FIG. 1, summing inputs 2, 3, 4, 5, carry inputs 6, 7, 8, a summation output 9 and carry outputs 10, 11, 12. The summing inputs are organized into first summing inputs 2, 3, 4 for receiving the intermediate carry bits X, Y, Z and a further input 5 for receiving an intermediate summation bit N. As already noted with regard to FIG. 2, the first three input bits X, Y, Z to be summed may advantageously already be present in sorted fashion, that is to say in such a way that input bits having the same logic level are present at two adjacent inputs in each case.

The CR adder 1 illustrated in FIG. 3 has a first (optional) sorting device 16, a second sorting device 17, a coding device 18, a carry device 19 and a summing device 20.

The first sorting device 16 is coupled to the first group of summing inputs 2, 3, 4 and performs a sorting of the input bits X, Y, Z present in such a way that, at three sorter outputs 21, 22, 23 of the first sorting device 16, set or non-set bits are present in each case contiguously at the outputs 21, 22, 23 and in each case in a manner sorted "toward the left" or "toward the right".

FIG. 4 illustrates a corresponding sorting table. Eight possible bit combinations of the input bits X, Y, Z are conceivable at the three first inputs 2, 3, 4 of the CR adder 1 or the corresponding inputs of the first sorting device 16. With regard to a summation value from the three input bits X, Y, Z, however, only four different states each corresponding to one of the summation values 0, 1, 2, 3 are possible. Therefore, if the corresponding input bits X, Y, Z are not already present in presorted fashion, the first sorting device 16 maps them in the manner shown in the table of FIG. 4. Set bits are in each case shifted "toward the right" and non-set bits "toward the left". This sorting enables simpler further processing in the further functional blocks 17, 18, 19, 20 of the CR adder 1 according to the invention.

The second sorting device 17 connected downstream of the first sorting device 16 then has three first inputs 24, 25, 26 for receiving the three sorted bits A, B, C supplied at the three outputs 21, 22, 23 of the first sorting device 16, and a further input 27 for receiving the fourth input bit N present at the fourth input 5 of the CR adder 1. The second sorting device 17 supplies sorted bits B0, B1, B2, B3 at four outputs 28, 29, 30, 31, which bits are sorted in such a way that different logic levels are present at at most two adjacent outputs 28, 29, 30, 31. To put it clearly, this means that set bits occur at contiguously adjacent outputs 28, 29, 30, 31 and only two contiguous groups of outputs 28, 29, 30, 31, namely with bits present in set and non-set fashion, are present. This means that 16 possible combinations of logic levels at the inputs 24, 25, 26, 27 of the second sorting device 17 are mapped onto five combinations of logic levels at the outputs 28, 29, 30, 31.

The first and second sorting devices 16, 17 may also be regarded in combination as a single sorting device 32 which outputs the input bits X, Y, Z, N to be summed which are present at the summing inputs 2, 3, 4, 5 in sorted fashion at sorter outputs 28, 29, 30, 31 in such a way that different levels are present at at most two adjacent sorter outputs 28, 29, 30, 31.

The functioning of the second sorting device 17 is explained in more detail below with reference to FIG. 5.

The sorted bits B0, B1, B2, B3 are fed to inputs 33, 34, 35, 36 of the coding device 18, which outputs five state indication bits N0, N1, N2, N3, N4 at its outputs 37, 38, 39, 40, 41. Each of the state indication bits N0, N1, N2, N3, N4 indicates a summation value of the input bits X, Y, Z, N now present in the form of the sorted bits B0, B1, B2, B3. Correspondingly, only one of the state indication bits N0, N1, N2, N3 is ever set and corresponds to a summation value decimal 0, 1, 2, 3 or 4. The five state indication bits N0, N1, N2, N3, N4 are fed in each case to five inputs 42, 43, 44, 45, 46 of the carry device 19 and five inputs 47, 48, 49, 50, 51 of the summing device 20.

The sorting devices 16, 17 and the coding device 18 may also be embodied as an integrated sorting-coding device 88. A corresponding sorting-coding device 88 then receives unsorted input bits X, Y, Z, N at its inputs and supplies the state indication bits N0, N1, N2, N3, N4 at outputs 37, 38, 39, 40, 41.

The carry device 19 has three carry inputs 52, 53, 54, which are connected to the carry inputs 6, 7, 8 of the CR adder 1 and receive the input carry bits C0IN, C1IN, C2IN. The three output carry bits C0OUT, C1OUT, C2OUT can be tapped off at three carry outputs 55, 56, 57 of the carry device 19 and are passed to the carry outputs 10, 11, 12 of the CR adder 1. The functioning of the carry device 19 is explained in more detail below with reference to FIGS. 9 to 13.

The summing device 20 has three carry inputs 58, 59, 60, which are in each case connected to the carry inputs 6, 7, 8 of the CR adder 1 and receive the input carry bits C0IN, C1IN, C2IN. The summation bit S can be tapped off at an output 61 of the summing device 20 and is passed to the summation output 9 of the CR adder.

Figure 5:
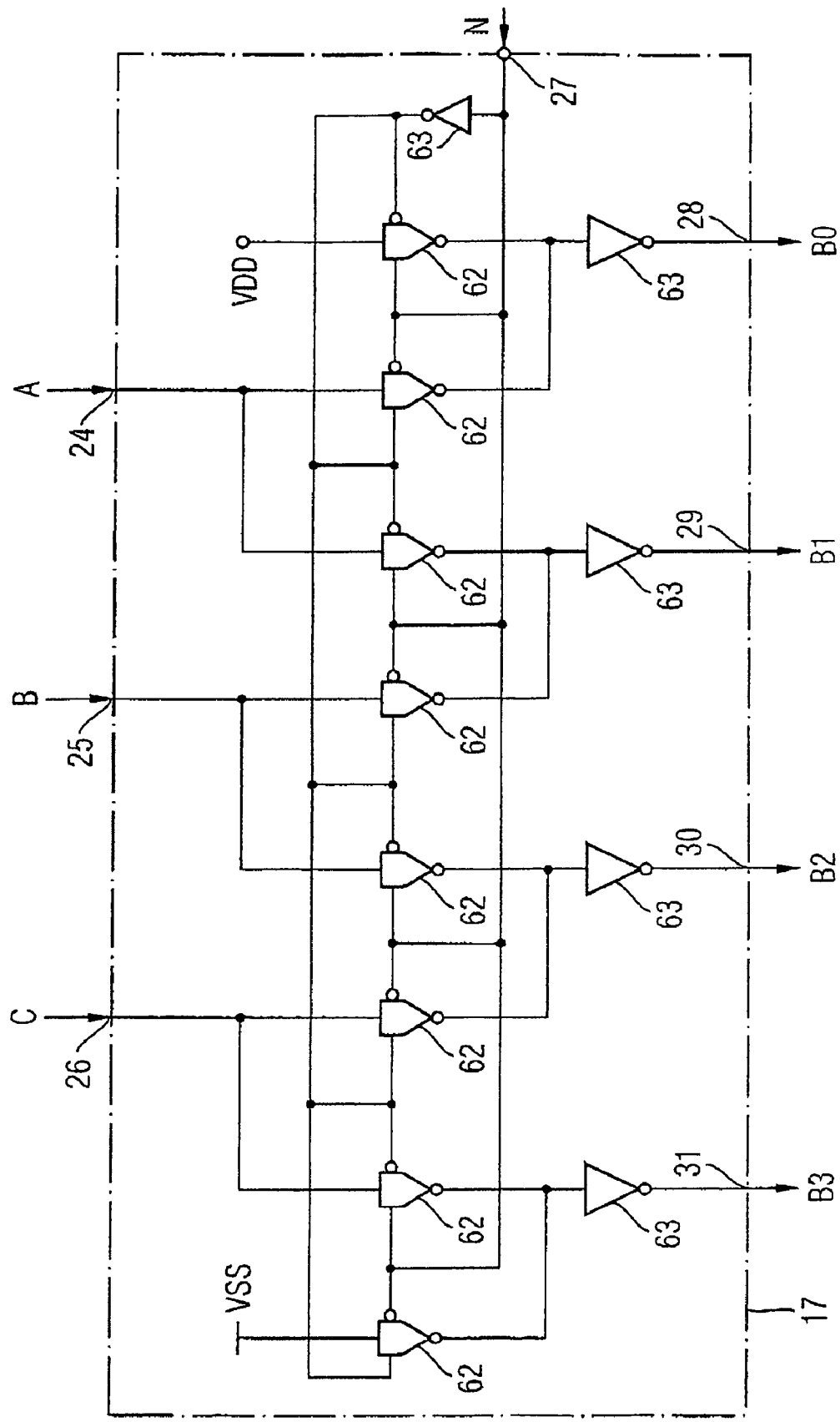
FIG. 5 is a sorting device for bits to be added.

FIG. 5 shows the second sorting device 17, to which the input bits A, B, C present in sorted fashion are fed at the first three inputs 24, 25, 26 and the further input bit N to be summed is fed at a further input 27. The sorting device 17 has eight parallel-connected tristate gates or tristate inverters 62 and five inverters 63, which are connected up to one another as illustrated in FIG. 5. Furthermore, a first internal supply voltage terminal VDD and a second internal supply voltage terminal VSS are provided. It is assumed below that set bits are at a voltage level corresponding to the first supply voltage potential VDD and non-set bits at a level corresponding to the second supply voltage potential VSS.

Figure 6A:
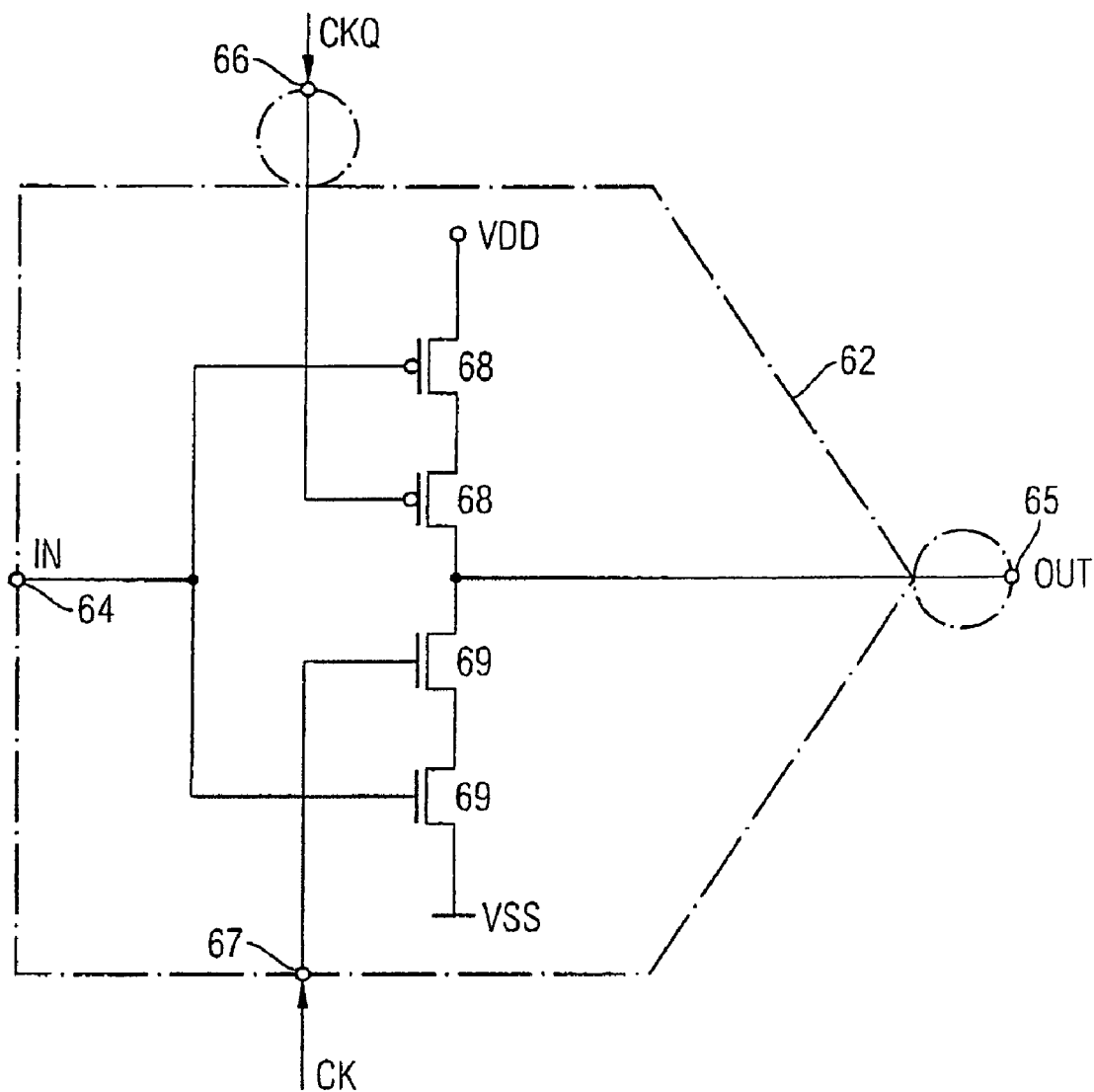
FIG. 6 is a tristate gate used in the sorting device.

The functioning of the tristate gates 62 is elucidated in FIGS. 6a/6b. The tristate gate 62 has an input 64 and an output 65 and also two control inputs 67, 66 which are respectively complementary to one another and to which complementary control signals CK, CKQ are connected. A corresponding tristate gate 62 or a tristate inverter provides three different states at its (inverting) output 65. If a logic H level, that is to say the same level as the first supply voltage potential VDD, is present at the inverting control input 66 and a logic L level, that is to say the same level as the second supply voltage potential VSS, is correspondingly present at the noninverting control input 67, the output terminal 65 of the tristate inverter 62 is at high impedance since the output is decoupled from the supply voltage potentials VSS, VDD by the two complementary transistors 68, 69.

The tristate inverter 62 has two first PMOS transistors 68, the controllable paths of which are connected in series between the first supply voltage potential VDD and the output 65 of the tristate inverter. Two further NMOS transistors 69 are provided, the controllable paths of which are connected in series between the output 65 and the second supply voltage potential VSS. The respective control terminals of the two complementary transistors 68, 69, the controllable paths of which are connected to the output 65, are coupled to the inverting control input 66 (PMOS transistor 68) and the noninverting control terminal 67 (NMOS transistor 69). The input signal IN is passed to the two remaining control terminals of the remaining two transistors, said input signal being coupled in via the input 64 of the tristate inverter 62.

Figure 6B:
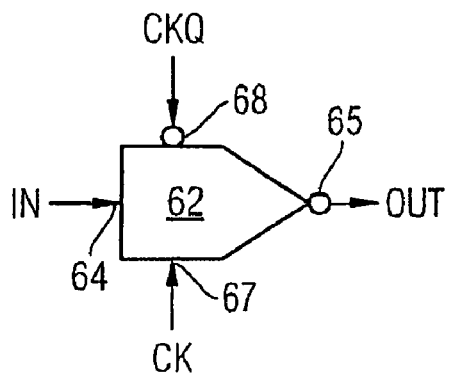

FIG. 6b illustrates a corresponding equivalent circuit diagram for elucidating the signals coupled in. If a logic L level is present at the inverting control input 66 of the tristate inverter 62 and a corresponding complementary control signal at H level is present at the noninverting control input 67, the tristate inverter 62 operates like a customary inverter.

Returning to the sorting device in accordance with FIG. 5, it is assumed that the input bits A, B, C are present in presorted fashion, that is to say that set bits are in each case sorted "toward the right" toward the first sorter input 24.

If the further input bit N present at the further input 27 is then at logic H level, every second tristate inverter 62 is put into its high-impedance state. The eighth tristate inverter 62, the input of which is connected to the first supply voltage potential VDD, inverts the supply voltage potential VDD to form a logic L level, which is in turn inverted by the inverter 63 connected to the first output 28 and outputs a sorted bit B0 at logic H level.

The remaining tristate inverters 62 operating as inverters are connected, then, in such a way that the first input bit A is passed via a tristate inverter 62 and an inverter to the second sorter output 29 as sorted bit B1, the second input bit B is present as third sorted bit B2 and the third input bit C is present as fourth sorted bit B3 at the corresponding outputs 29, 30, 31 of the sorting device 17. Therefore, if the further input bit N is at logic H level, the first input bits A, B, C already present in presorted fashion are shifted "toward the left" and the set further bit is set to the "right-hand" digit (C, B, A, N, if N=1).

If the further input bit N is at logic L level, it is passed through the sorting device 17 to the fourth sorter output 41 as fourth sorted bit B3 (N, C, B, A, if N=0). The corresponding sorted bits B0, B1, B2, B3 are thus always present in sorted fashion at the sorter outputs 28, 29, 30, 31 in such a way that bits having a different logic level are present only at at most two adjacent outputs 28, 29, 30, 31.

Figure 7:
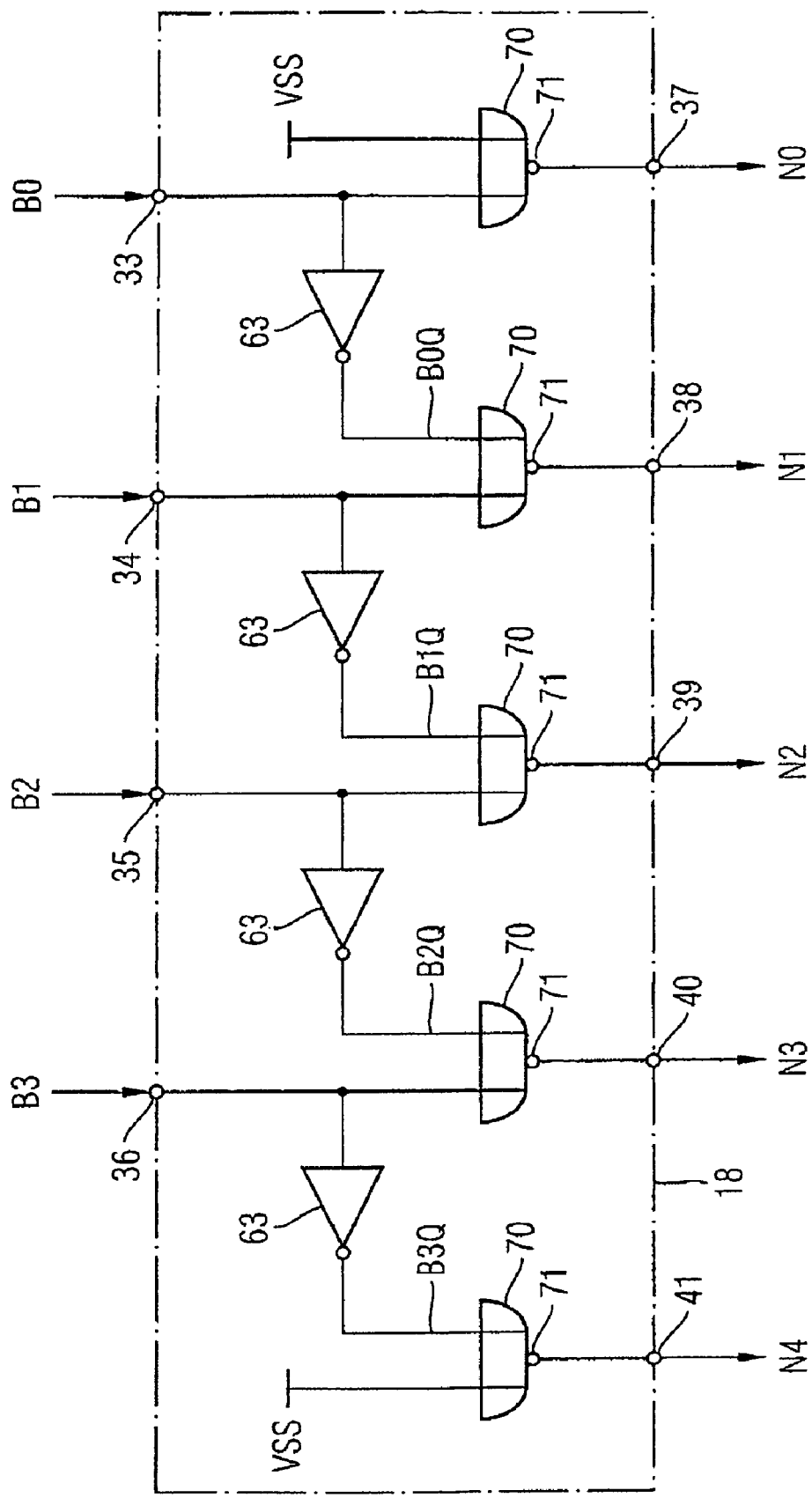
FIG. 7 is a coding device according to the invention.

FIG. 7 shows a coding device 18 according to the invention, to which the four sorted bits B0, B1, B2, B3 to be summed are fed. The coding device 18 has four coder inputs 33, 34, 35, 36 and five coder outputs 37, 38, 39, 40, 41. Furthermore, five NOR gates 70 are provided, the outputs of which are respectively connected to the coder outputs 37, 38, 39, 40, 41 of the coding device 18. The NOR gate 70 connected to the first sorter output 37 is fed the first sorted input bit B0 and the second supply voltage potential VSS. The NOR gate 70 connected to the second sorter output 38 is fed to the second sorted input bit B1 and the inverted first input bit B0Q. The NOR gate 70 connected to the third sorter output 39 is fed the third sorted input bit B2 and the inverted second sorted input bit B1Q. The NOR gate 70 connected to the fourth sorter output 40 is fed the fourth sorted input bit B3 and the inverted third sorted input bit B2Q. The NOR gate 70 connected to the fifth sorter output 41 is fed the second supply voltage potential VSS and the inverted fourth sorted input bit B3Q. The respective inverted bits B0Q, B1Q, B2Q, B3Q are generated by inverters 63 in accordance with the circuit arrangement.

FIG. 8 shows a corresponding truth table of the coding device 18 in accordance with FIG. 7. Each summation value is thus assigned an unambiguous state indication bit N0, N1, N2, N3, N4. If, by way of example, all the sorted input bits are set, only the fifth state indication bit N4 is set, while the remaining state indication bits N0, N1, N2, N3 are not set. The first state indication bit N0 is thus assigned a summation value of decimal 0, the second state indication bit N1 decimal 1, the third state indication bit N2 decimal 2, the fourth state indication bit N3 decimal 3 and the fifth state indication bit N4 is assigned the summation result of decimal 4, as explained previously.

Figure 9:
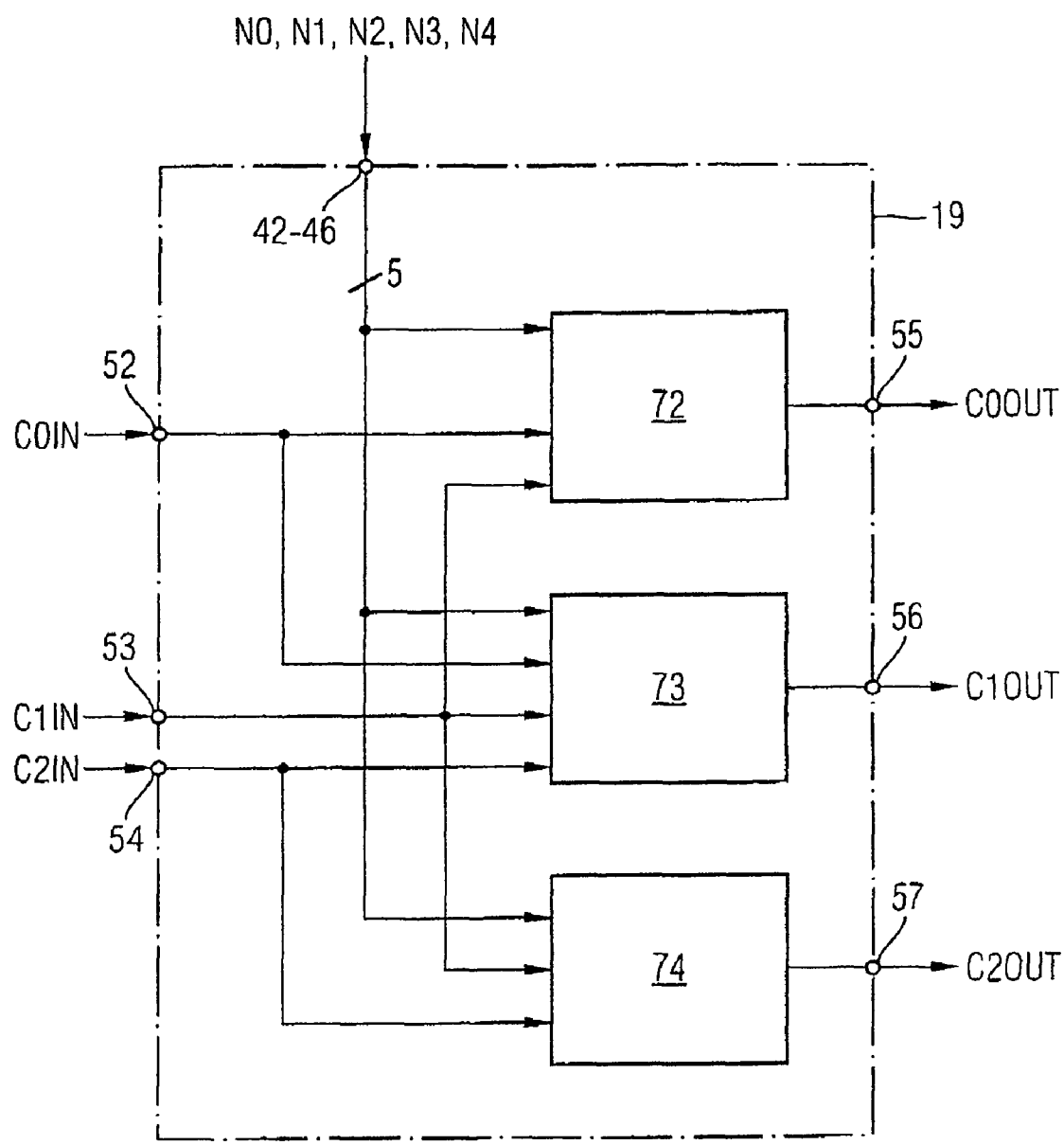
FIG. 9 is a block diagram of a carry device according to the invention.

These state indication bits N0, N1, N2, N3, N4 are then advantageously used for switching controllable paths in the carry device 19 and the summing device 20. FIG. 9 illustrates a block diagram of a carry device 19 according to the invention.

The carry device has five inputs 42-46 for the state indication bits N0, N1, N2, N3, N4, three carry inputs 52, 53, 54 for the equivalent carry bits C0IN, C1IN, C2IN and three carry outputs 55, 56, 57 for the output carry bits C0OUT, C1OUT, C2OUT. In this case, a first carry logic 72 supplies the first output carry bit C0OUT in a manner dependent on the state indication bits N0, N1, N2, N3, N4, the first input carry bit C0IN and the second input carry bit C1IN. The second carry logic 73 supplies the second output carry bit C1OUT in a manner dependent on the state indication bits N0, N1, N2, N3, N4 and the three input carry bits C0IN, C1IN, C2IN. The third carry logic 74 supplies the third output carry bit C2OUT in a manner dependent on the state indication bits N0, N1, N2, N3, N4, the second input carry bit C1IN and the third input carry bit C2IN.

FIG. 10 shows a corresponding truth table for the carry device 19. By virtue of the coding in the form of the state indication bits N0, N1, N2, N3 and N4, the possible summation values of the four input bits to be added are reduced to just five different states indicated by N0, N1, N2, N3, N4. Since the input carry bits C0IN, C1IN, C2IN are also present in presorted fashion, that is to say the combinations of logic states possible in the case of three bits at the carry inputs of $2^3=8$ are reduced to just four states. Overall, this results in 5×4=20 combinations of state indication and input carry bits present. The corresponding output carry bits C0OUT, C1OUT, C2OUT are again present in presorted fashion at the carry outputs 55, 56, 57 in such a way that the same logic levels are present at in each case two adjacent carry outputs 55, 56, 57.

Figure 11:
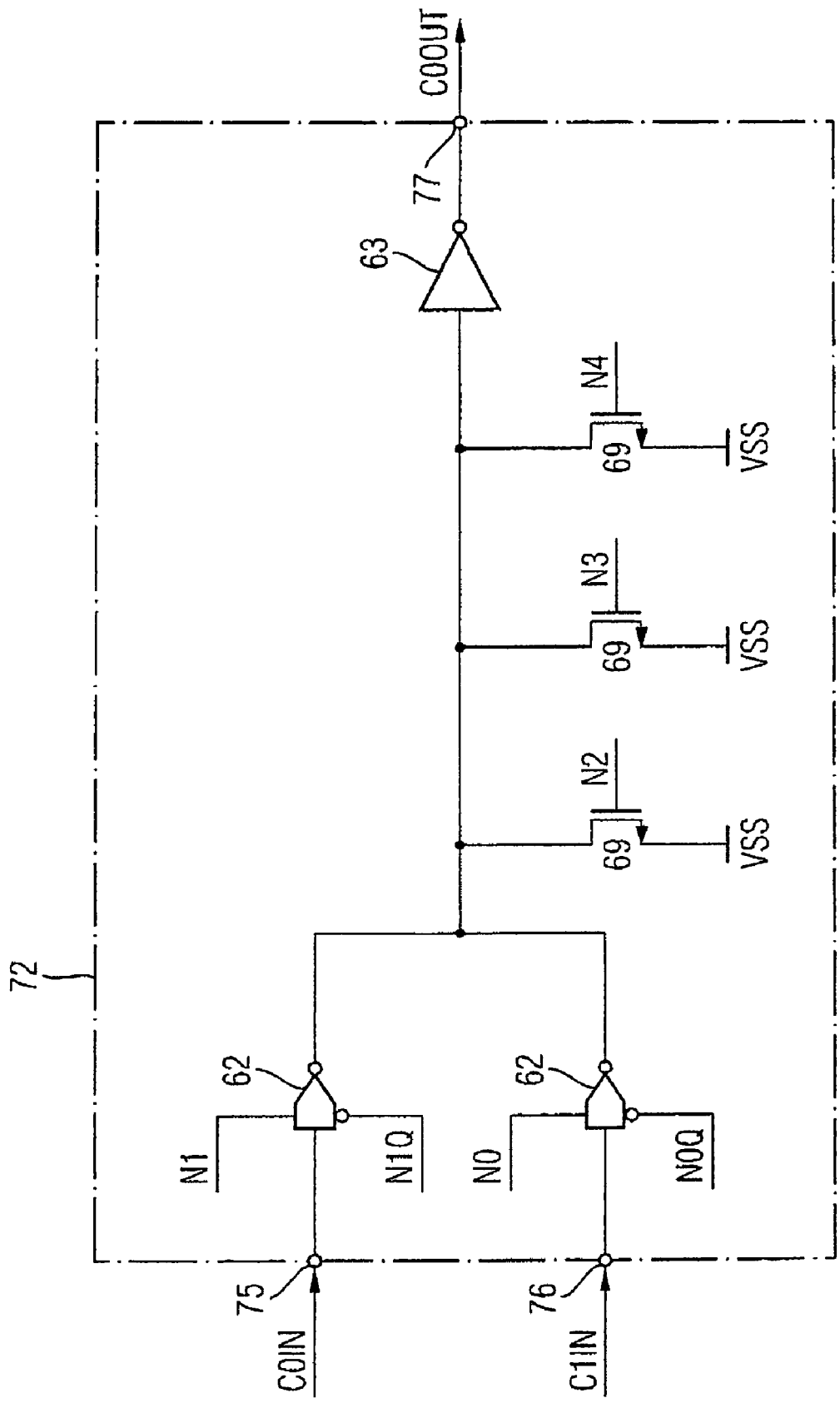
FIG. 11, FIG. 12, FIG. 13 are logic circuits for determining output carry bits of the carry device.

FIG. 11 shows a circuit arrangement for the first carry logic 72. Provision is made of a first input 75 for the first input carry bit C0IN and a second input 76 for the second input carry bit C1IN 76. The first carry logic 72 has an output 77 for the first output carry bit C0OUT. Furthermore, tristate inverters 62 and NMOS transistors 69 and also an inverter 63 are connected up to one another as illustrated in FIG. 11. The first carry logic 72 is furthermore fed the five state indication bits N0, N1, N2, N3, N4, N0Q and N1Q being the corresponding inverted state indication bits in FIG. 11. The inverted signals can be generated by means of inverters, for example. At most two controllable paths of controllable switches or transistors are in each case present between the carry output 77 and an internal supply voltage terminal VSS. This also holds true particularly if the P- and NMOS transistors kept available in the tristate inverters 62 are taken into consideration. Consequently, the number of logic gates between a carry input 75, 76 and a carry output 77 of the first carry logic 72 is extremely small, whereby the carry path is traversed very rapidly.

Figure 12:
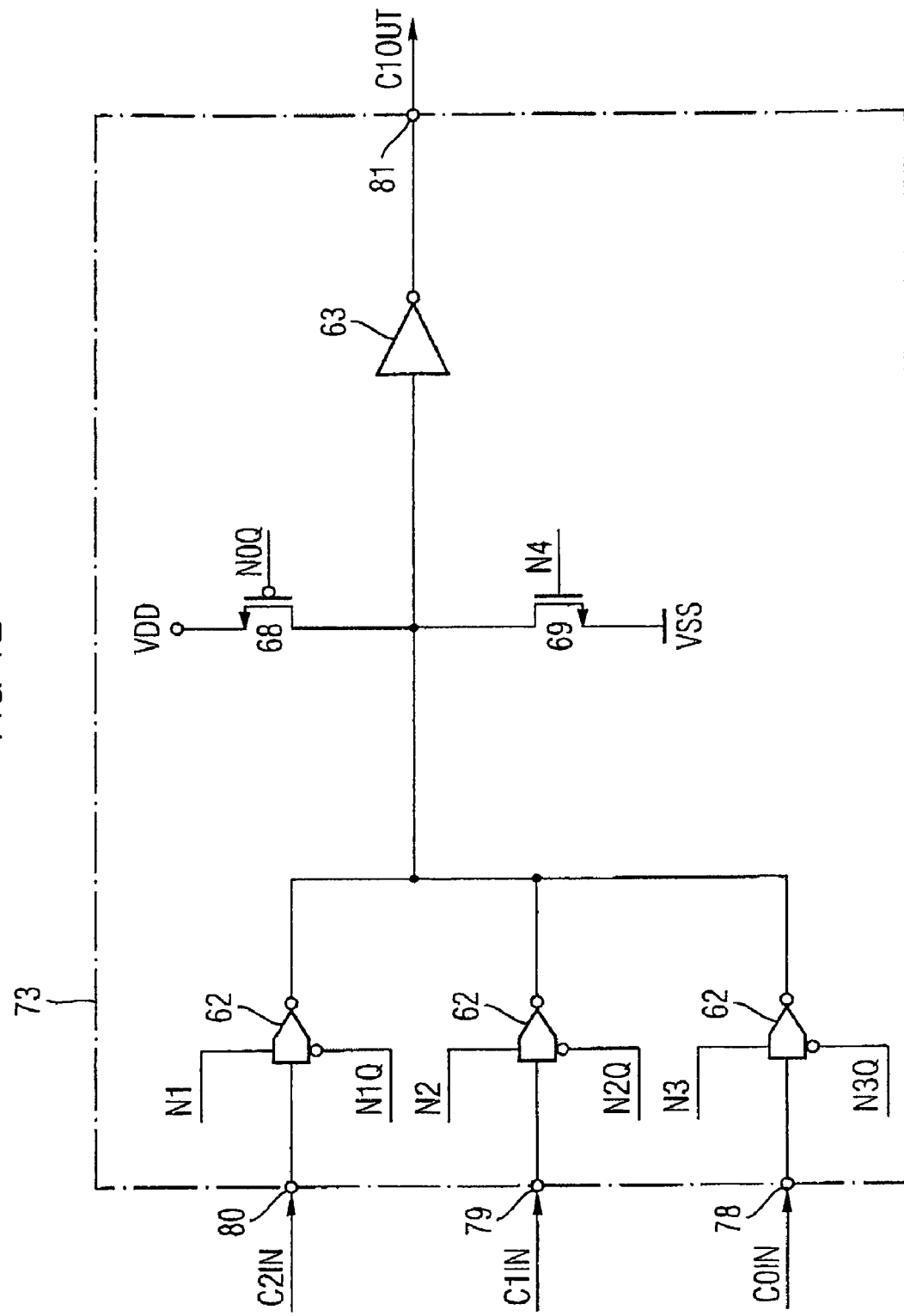

FIG. 12 illustrates a circuit arrangement for the second carry logic 73. The second carry logic 73 has a first, second and third carry input 78, 79, 80 for the three input carry bits C0IN, C1IN, C2IN and an output for the second output carry bit C1OUT. Furthermore, the second carry logic 73 is fed to the state indication bits N0, N1, N2, N3, N4, the signals N1Q, N2Q, N3Q, N0Q representing the corresponding inverted signals, which can be generated by means of inverters, for example. Three tristate inverters 62, a PMOS transistor 68 and an NMOS transistor 69 and also an inverter 63 are provided, which are connected up to one another as illustrated in FIG. 12. As already noted with respect to the first carry logic 72 from FIG. 11, only few logic gates are situated between a carry input 79, 79, 80 and the carry output 81, whereby the critical path is traversed particularly rapidly.

Figure 13:
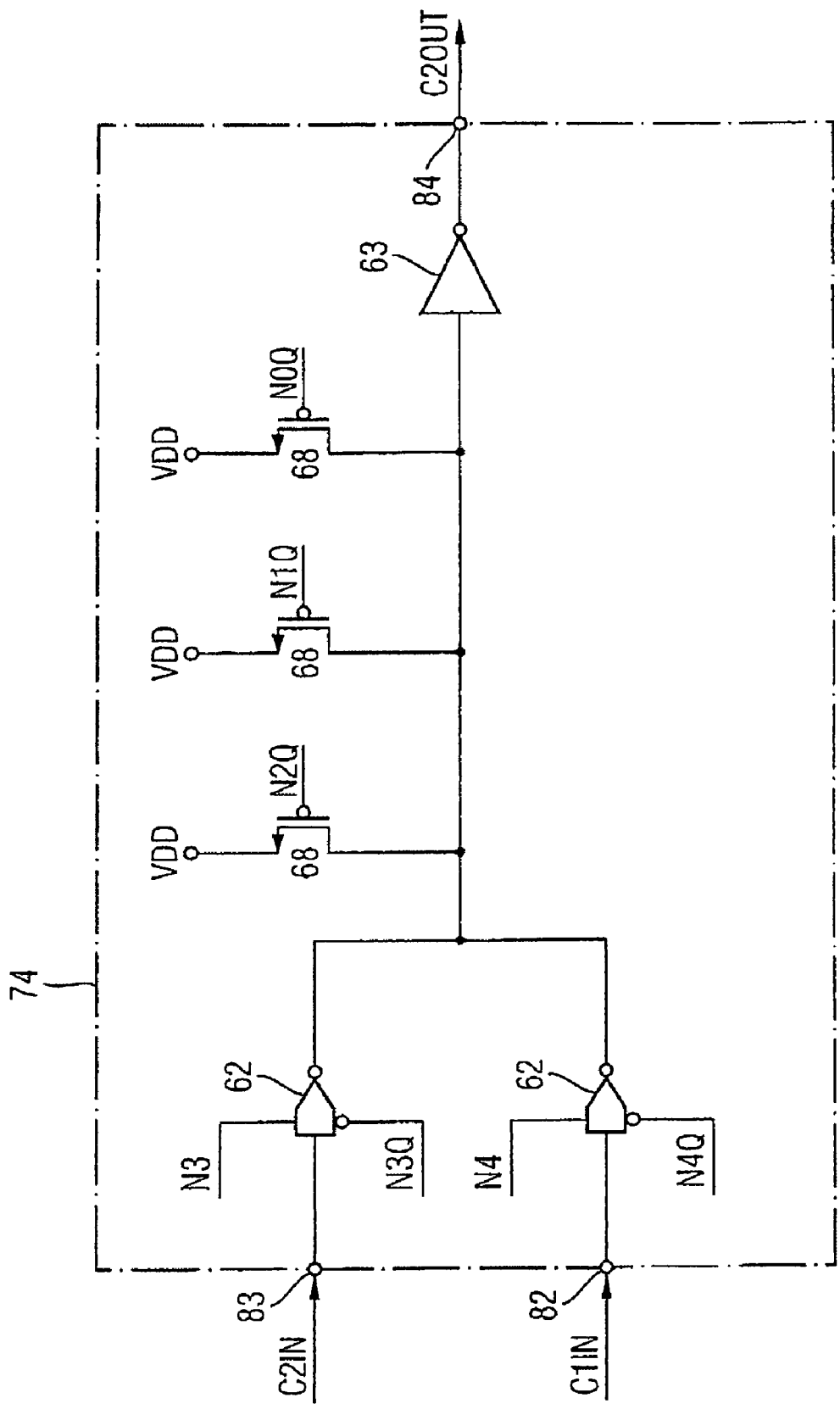

FIG. 13 illustrates a circuit arrangement for the third carry logic 74. The third carry logic 74 has a first and second carry input 82, 83 for the second and third input carry bits C1IN, C2IN and an output 84 for the third output carry bit C2OUT. Furthermore, the third carry logic 74 is fed the state indication bits N0, N1, N2, N3, N4, the signals N0Q, N1Q, N2Q, N3Q, N4Q representing the respective inverted signals, which can be generated by means of inverters, for example. The third carry logic has two tristate inverters 62, three PMOS transistors 68 and also an inverter 63, which are connected up to one another as illustrated in FIG. 13. In the case of the third carry logic 64, too, the carry path between a carry output 84 and a carry input 82, 83 has particularly few logic gates. The particularly small number of controllable paths or logic gates is possible in particular by virtue of the fact that, according to the invention, firstly the state indication bits N0, N1, N2, N3, N4 are generated which are used for switching the transistors used in the carry logics 72, 73, 74.

Figure 14:
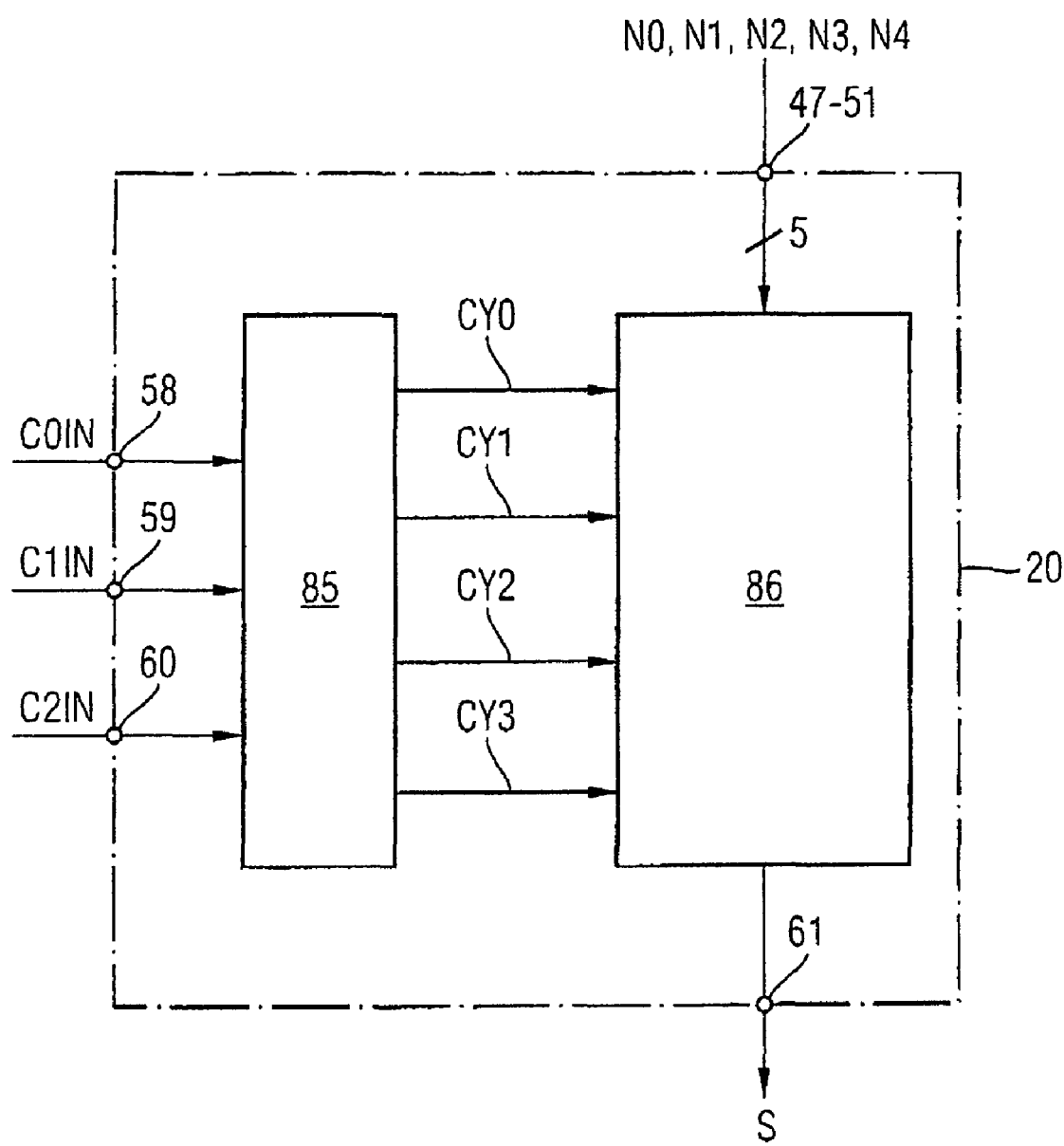
FIG. 14 is a block diagram of a summing device.

FIG. 14 illustrates a block diagram of the summing device 20. The summing device 20 has three carry inputs 58, 59, 60 for the input carry bits C0IN, C1IN, C2IN, five inputs 47-51 for the state indication bits N0, N1, N2, N3, N4 and a summation output 61 for outputting the summation bit S. The summing device 20 furthermore has a sorting logic 85 for providing sorting bits CY0, CY1, CY2, CY3 and a summing logic 86 for generating the summation bit S in a manner dependent on the sorting bits CY0, CY1, CY2, CY3 and the five state indication bits N0, N1, N2, N3, N4 or their inverted signals, which can be generated by means of inverters.

The corresponding truth table for the summing device 20 is illustrated in FIG. 15. Once again five possible states are characterized by the state indication bits N0, N1, N2, N3, N4 and four different states are characterized by the sorted input carry bits C0IN, C1IN, C2IN, whereby a total of 20 different input combinations of state indication and input carry bits present are possible.

Figure 16:
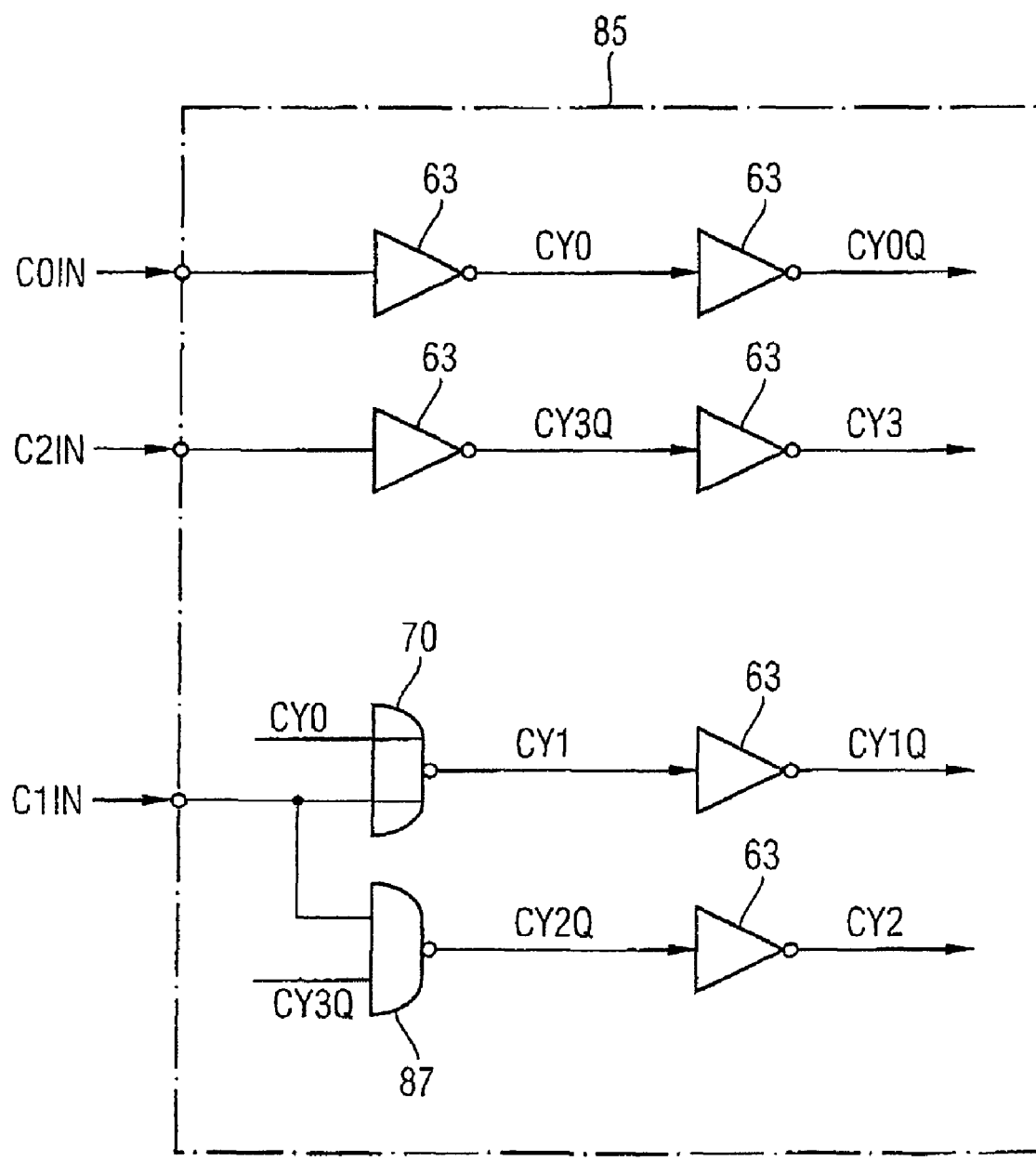
FIG. 16, FIG. 17 are logic circuits for determining the summation bit.

FIG. 16 shows a schematic circuit arrangement for the sorting logic 85. The sorting logic 85 is fed the three input carry bits C0IN, C1IN, and C2IN, which, by means of the inverters 63 illustrated, the NOR gate 70 and the NAND gate 87, generate the sorting bits CY0, CY1, CY2, CY3 in accordance with the interconnection illustrated in FIG. 16. The respective inverted signals or bits are designated by CY0Q, CY1Q, CY2Q, CY3Q.

Figure 17:
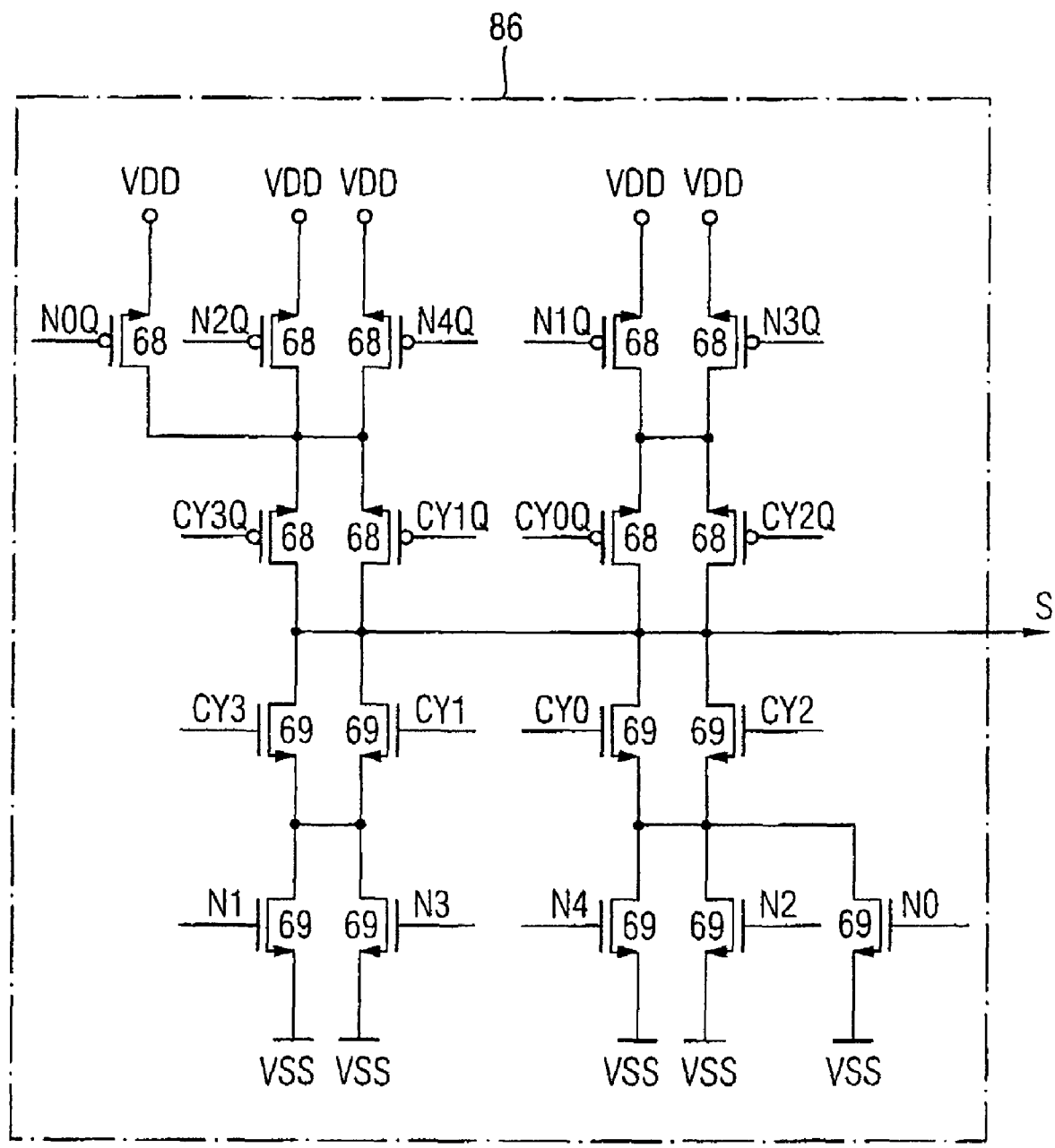

FIG. 17 illustrates a circuit arrangement for the summing logic 86, which generates the summation bit S in a manner dependent on the sorting bits CY0, CY1, CY2, CY3 provided by the sorting logic 85 and the state indication bits N0, N1, N2, N3, N4. The summing logic 86 has a multiplicity of PMOS transistors 68 and also a multiplicity of complementary NMOS transistors 69, which are connected up to one another as illustrated in FIG. 17. In each case only at most two controllable paths of transistors 68, 69 are ever situated between the summation output 61 and an internal supply voltage terminal VDD, VSS of the summing device or the summing logic 86.

The present invention thus supplies a particularly fast carry-ripple adder which has only a particularly small number of logic gates in the carry path and is thereby particularly suitable for use in an adding apparatus whose output stage is constructed from carry-ripple adders according to the invention. By means of the 4-bit carry-ripple adder according to the invention, the calculation of the respective summation bits in a manner dependent on carry bits from a next lower significance is particularly fast.

Although modifications and changes may be suggested by those skilled in the art, it is an intention of the inventors to embody within the patent warranted hereon all changes and modifications as reasonably and properly come within the scope of their contribution to the art.

We claim as our invention:

1. A carry-ripple adder, comprising:
    four summing inputs for receiving four input bits having the significance w that are to be summed;
    three carry inputs for receiving three input carry bits having the significance w;
    a summation output for outputting an output summation bit having the significance w;
    three carry outputs for outputting three output carry bits having the significance 2w;
    a coding device having coder inputs for receiving said input bits to be summed, wherein said coder device comprises five coder outputs, wherein a state indication bit is present at each of said coder outputs; and wherein in each case only one of said state indication bits is set and each of said state indication bits is assigned to a summation result of said four input bits to be summed; and
    a summing device which supplies said output summation bit dependent on said state indication bits and said input carry bits.

2. The adder of claim 1, wherein said input bits to be summed are present in a presorted fashion at said summing inputs in such a way that different logic levels are present at at most two adjacent of said summing inputs.

3. The adder of claim 1, wherein said input carry bits are present in a presorted fashion at said carry inputs in such a way that same logic levels are present at at least two adjacent of said carry inputs.

4. The adder of claim 1, wherein said output carry bits are present in sorted fashion at said carry outputs in such a way that the same logic levels are present at at least two adjacent of said carry outputs.

5. The adder of claim 1, comprising a carry sorting device for receiving said input carry bits present at said carry inputs and for outputting said carry bits in a sorted fashion at said carry outputs in such a way that same logic levels are present at at least two adjacent of said carry sorter outputs.

6. The adder of claim 1, wherein said four summing inputs are a first, a second, a third and a fourth summing input and said input bits of said first, second, and third summing inputs are present in a presorted fashion in such a way that same logic levels are present at at least two adjacent of said first, second, and third summing inputs, and a further of said input bits is present at said fourth summing input.

7. The adder of claim 6, comprising a sorting device for receiving input bits to be summed which are present at said summing inputs and for outputting said input bits in a sorted fashion at sorter outputs of said sorter device in such a way that different logic levels are present at at most two adjacent of said sorter outputs.

8. The adder of claim 7, comprising a coding device having coder inputs for receiving said input bits to be added; said coder device comprising five coder outputs, a state indication bit being present at each of said coder outputs; said sorting device and said coding device being embodied as an integrated sorting-coding device.

9. The adder of claim 8, wherein in each case only one of said state indication bits is set and each of said state indication bits is assigned to a summation result of said four input bits to be summed.

10. The adder of claim 8, comprising a summing device which supplies said output summation bit dependent on said state indication bits and said input carry bits.

11. The adder of claim 8, comprising a carry device for receiving said input carry bits and for outputting said output carry bits; said carry device supplying said output carry bits dependent on said state indication bits and said input carry bits.

12. The adder of claim 8, further comprising a carry device comprising a plurality controllable switches each having a control terminal and a controllable path,
    wherein each of said state indication bits controls one of said controllable switches.

13. The adder of claim 12, wherein at most two controllable paths of controllable switches are arranged between a respective carry output and a supply voltage terminal.

14. The adder of claim 1, comprising a carry device for receiving said input carry bits and for outputting said output carry bits; said carry device supplying said output carry bits dependent on said state indication bits and said input carry bits.

15. The adder of claim 1, comprising a carry device comprising a plurality of controllable switches each having a control terminal and a controllable path,
    wherein each of said state indication bits controls one of said controllable switches.

16. The adder of claim 15, wherein at most two controllable paths of said controllable switches are arranged between a respective carry output and a supply voltage terminal.

17. An adding device for summing a plurality of bit sets each comprising bits having the same significance w, wherein bits of different bit sets have a different significance, the adding device comprising:

a carry-save adder assigned to each of said bit sets, wherein said carry-save adder is summing the bits of said bit set and outputting an intermediate summation bit having the significance w of said bit set, and outputting at least two intermediate carry bits having the respective next higher significance 2w; and a carry-ripple adder assigned to at least one of said bit sets, wherein said carry-ripple adder is summing said intermediate summation bits having the significance w and at least two of said intermediate carry bits having the significance w of said respective bit set having the next lower significance w/2 taking account of at least two of said carry bits having the significance w, which were obtained during said summation of said bit sets having a lower significance, as input carry bits and for outputting a bit set summation bit having the significance w of said respective bit set and at least two of said carry bits having the respective next higher significance 2w as output carry bits;

wherein said carry-ripple adder comprises:

four summing inputs for receiving four input bits having the significance w that are to be summed;

three carry inputs for receiving three input carry bits having the significance w;

a summation output for outputting an output summation bit having the significance w;

three carry outputs for outputting three output carry bits having the significance 2w;

a coding device having coder inputs for receiving said input bits to be summed, wherein said coder device comprises five coder outputs, wherein a state indication bit is present at each of said coder outputs, wherein in each case only one of said state indication bits is set and each of said state indication bits is assigned to a summation result of said four input bits to be summed; and a summing device which supplies said output summation bit dependent on said state indication bits and said input carry bits; and wherein in a signal path between a carry input of said carry-ripple adder assigned to said bit set having the lowest significance and a carry output of said carry-ripple adder assigned to said bit set having the highest significance, the number of logic gates is at most twice the number of different significances.

18. The adder device of claim 17, wherein said carry-save adder is designed as a seven-bit adder and outputs the respective of said intermediate summation bits having said significance w and three intermediate carry bits having said significance 2w.

19. The adder device of claim 17, wherein said carry-ripple adder assigned to said bit set having the second lowest significance is fed to the intermediate carry bits of said carry-save adder assigned to the lowest significance as input carry bits.

* * * * *